United States Patent
Alonso (10) Patent No.: US 7,502,819 B2
(45) Date of Patent: Mar. 10, 2009

(54) DYNAMIC BROWSER INTERFACE (75) Inventor: Antonio Used Alonso, Zaragoza (ES)

(73) Assignee: Consultores UB57, S.L., Zaragoza (ES)

( * ) Notice: Subject to any disclaimer, the term of this patent is extended or adjusted under 35 U.S.C. 154(b) by 682 days.

(21) Appl. No.: 10/476,044

(22) PCT Filed: Jun. 14, 2002

(86) PCT No.: PCT/ES02/00298

§ 371 (c)(1),
(2), (4) Date: Oct. 28, 2003

(87) PCT Pub. No.: WO02/103556

PCT Pub. Date: Dec. 27, 2002

(65) Prior Publication Data

US 2004/0210819 A1 Oct. 21, 2004

(30) Foreign Application Priority Data

Jun. 15, 2001 (ES) .................................. 200101399

(51) Int. Cl.
*G06F 15/16* (2006.01)
(52) U.S. Cl. ...................... 709/203; 709/219
(58) Field of Classification Search ................ 709/201, 709/203; 705/27, 15, 26; 701/201
See application file for complete search history.

(56) References Cited

U.S. PATENT DOCUMENTS

| | | | |
|---|---|---|---|
| 5,555,354 A | | 9/1996 | Strasnick et al. |
| 5,845,263 A | * | 12/1998 | Camaisa et al. ............... 705/27 |
| 5,966,126 A | | 10/1999 | Szabo |
| 6,037,944 A | | 3/2000 | Hugh |
| 6,041,331 A | | 3/2000 | Weiner |
| 6,134,564 A | | 10/2000 | Listou |
| 6,351,711 B1 | * | 2/2002 | Chansarkar ................. 701/213 |
| 6,385,602 B1 | * | 5/2002 | Tso et al. ....................... 707/3 |
| 6,401,029 B1 | * | 6/2002 | Kubota et al. ............... 701/201 |
| 6,801,908 B1 | * | 10/2004 | Fuloria et al. ................. 707/3 |

OTHER PUBLICATIONS

Andrews K., et al. Towards rich information landscapes for visualizing structured Web Spaces:. En: Proceedings. IEEE Symposium on Information Visualization '96 (Cat. No. 96TB 100083). Editado por: S. Card et al. Los Alamitos, CA, USA, Oct. 28-29, 1996. ISBN 0-8186-7668-X.
Munzner T., et al. "Visualizing the structure of the World Wide Web ind #D hyperbolic space". En: 1995 Symposium on the Virtual Reality Modeling Language (VRML '95). Editado: New York, NY, USA: ACM, 1996. p. 33-8, 138 of 139 pp. 10 refs. ISBN: 0-089791-818-5.

* cited by examiner

*Primary Examiner*—Joseph E Avellino
*Assistant Examiner*—Shaq Taha
(74) *Attorney, Agent, or Firm*—Collard & Roe, P.C.

(57) ABSTRACT

A dynamic browser interface that is designed to increase information search speed and capability and to make the search more intuitive. It has three basic elements: a multidimensional arrangement and presentation system (1) that is used to generate a navigation map (2): and to represent in at least more than one dimension the following items on the navigation map (2): access nodes (3); multiple categories (4) which are associated with each of the nodes (3); sensory designs (6) such that each node (3) is associated with the corresponding categories (4) thereof and symbols of the operators (11) on the nodes (3) and categories (4). It also includes a system for pre-selecting and visually searching for information (9) that is designed to provide operators (11) (Boolean, Venn, conditional, etc.) with a way for preselecting the desired nodes (3) and categories (4) and a system (7) for presenting the requested information (8) that provides the user with the information found (18) in a new navigation map (for more in-depth categorization), or a combination of both.

52 Claims, 4 Drawing Sheets

DYNAMIC BROWSER INTERFACE

CROSS REFERENCE TO RELATED APPLICATIONS

Applicants claim priority under 35 U.S.C. §119 of Spanish Application No. p 200101399 filed on Jun. 15, 2001. Applicants also claim priority under 35 U.S.C. §365 of PCT/ESO2/00298 filed on Jun. 14, 2002. The international application under PCT article 21(2) was not published in English.

OBJECT OF THE INVENTION

The present invention means to solve or minimize the drawbacks and disadvantages of current navigation interfaces that allow requesting, searching and displaying information requested by the user from an information system (such as the Internet, although the use of the invention is by no means limited to the Internet, as explained further below).

The drawbacks solved by the Dynamic Navigation Interface of the invention are, among others, the following:

Using ordering methods with a single criterion (affinity, order or group relations, functionality, etc.) to categorise menus and information in general.

Use of tree structures to order information, with the corresponding limitations.

Non-optimised categorisation and categorisation problems when an element belongs to more than one category (overlap) or when there is no element in one of the corresponding categories, leading to confusion, redundancies, non-optimised navigation, non-optimised information and memory tools, etc.

High click-through ratio (number of mouse clicks on links) or number of accesses or sequences required to access an information unit. This is a result of the need to access various successive categorisation menus until the final element is reached. This high number of clicks hinders navigation and access to information by the user, at times preventing it in practice (due to technological infrastructure problems, such as a network or modem bottleneck or to categorisation difficulties).

A need in certain cases to scroll in order to access links or categorised menus, which are hidden due to an excessive length or area of the information on the screen.

Impossibility of performing simultaneous categorisation by more than one dimension or criterion, which reduces the power and speed of the presentation, search and access to contents.

Ordering criteria are limited or lack affinities or relations (multidimensional, content related, mathematical, semantic, symbolic, ideographic, geometric, visual, aesthetic, etc.), which by a visual and multidimensional categorisation provided by the present invention would be solved.

Most pages include text elements to present and guide the contents, so that they are tiresome, counterintuitive and slow (as the text must be read first) and are limited to users able to read in a certain language or without eyesight difficulties or other handicaps which limit access to information.

Temporary or permanent health disorders or physical or psychological disorders due to an extended exposure accessing the information unit, to the effort required to navigate in text-based systems, to radiations, etc.

Return to the previous menu or to the home page by links or areas (such as buttons, banners, etc.) limited or generally belonging to the Internet browser or the external application of the information system, hindering the operation of accessing information.

Cross navigation is hindered, or at best implies a high number of mouse clicks and/or selections and accesses with return load times to the point of the junction (or point of union of the branch containing the first element and the branch containing the second element searched) of the hierarchy tree formed by the Categorisation, Ordering, Systematisation, Sectoring and Segmentation criteria (hereinafter COSSS), and further clicks in the direction of the information searched for according to their COSSS criteria. Although it is true that in certain cases this problem is solved by including crossed links, this association is not always intuitive for the user (as they are text-based and generally located in odd positions of the screen area, or at times even out of sight), segmenting the navigation habits for these reasons and requires design efforts by the webmaster.

Memory load of a full new page takes place after accessing the link with a high implication of performance and time, connection costs, productivity, need for technological infrastructure, efficiency of the Internet server or of the information server accessed.

It is difficult for the user to know the location of the site he/she is in at each time, its relation with other information points and how to access these directly. Although this can be achieved by a site map, available in certain sites, these maps do not solve this limitation fully nor do they have all the advantages of the invention disclosed. They generally have an alphabetical order or a tree structure.

The information and interaction capabilities are organised linearly or by nodes (with a tree structure) so that it is necessary to access the content of the information to be aware of its interest, use, properties, functionality, etc. Thus, a blind navigation takes place where little qualitative or quantitative information is offered on the information element before it is accessed or activated.

An issue of great relevance is that accessing through link nodes is currently only performed one by one; that is, pre-selection or simultaneous access to more than one information node or link is not possible. The present invention intends to solve this problem providing a multidimensional screen for multiple connection and pre-selection.

Simultaneous or parallel (multidimensional) comparison of information elements or of the characteristics of these is hindered or prevented, requiring successive access and in certain cases return accesses, which implies additional disadvantages of time and cost.

Thus, the Dynamic Navigation Interface of the present invention provides a number of advantages which can benefit both users of information access systems and those commercialising these systems, as well as third parties:

Benefits to the user of an information system provided with the Dynamic Navigation Interface of the present invention:

Faster and more efficient navigation. Navigation is facilitated as the text content is reduced, providing COSSS information (Categorisation, Ordering, Systematisation, Sectoring and Segmentation) by visual, sensory, mathematical, semantic, ideographic, graphic or implicit symbolic information.

More enjoyable, relaxed, comfortable and intuitive navigation, facilitating interaction with the information. The optical laws that rule the human brain allow discriminating more easily the desired information units by means of colour codes, patterns and optical codes in general, resulting in a reduced hassle and fatigue for a given amount and density of information.

Shorter information download and access time compared to current information search and access systems:

If T1 is the time taken for a standard page to download from its server with the current technique, the total time required to access a page located at a depth level n in a tree structure is n×T1.

If T2 is the time taken to download a page with the present invention, and T3 is the time taken to select the various visibility and enabling levels for the various elements or categories according to the present invention (generally T2>T1>T3), the total time required to access a page at a depth level n is T1+T2+n×T3, so that after a certain number of accesses n>"N of intersections of these functions" the invention proposed allows saving time compared to the current art.

Accessing pre-categorised and pre-selected nodes and links means that the possibility of accessing an incorrect link (when a different content was expected) is reduced. This error would imply a time cost of 2×t (path travelled and returned).

Allows creating modular download times, in accordance with downloading of graphics with modular and selectable complexity.

Provides information with a higher absolute power, as it informs of a greater number of characteristics or dimensions on the information element to be accessed. It also provides information that is richer and has greater depth on the characteristics of discriminated, undesired or not selected elements, increasing efficiency.

Greater quality, power, depth and richness of information.

Lower click-through ratio (number of mouse clicks on links).

Greater amount of information presented in a given time of search session and query.

Greater amount of information per unit surface on screen.

Possibility of accessing information when it is otherwise difficult or impossible in practice (such as with eyesight or language barriers).

Link nodes can provide more information on the corresponding information element without having to activate them.

Recognition of information units is facilitated firstly by an intuitive navigation and secondly by the visualsensory memory. Also facilitated is the recognition and instantaneous location of information elements by means of their geometrical-visual-sensory, mathematical, semantic, ideographic, graphic or implicit symbolic relations.

After the user pre-selects the categories or information elements of interest, the free area of the screen increases greatly, thereby also increasing the possibilities and value of the advertisements which can be presented (greater area and greater visibility), and the amount and quality of the information.

The functional power of the data base is increased by optimising the ordering, pre-selection and search criteria.

Benefits for the power marketer derived from an information system provided with the Dynamic Navigation Interface of the present invention:

The site (or Internet site) will have an improved presentation and appearance.

Problems of overlapping of information elements are solved, as it is possible to categorise simultaneously by more than one criterion or dimension.

Allows showing a greater quantity of information per unit surface (information density), as it is possible to obtain a greater quantity, depth and richness of the information presented so that the physical, functional, constructive, brand, sector, group or any other characteristics are visually and intuitively displayed.

Allows personalising and auto-configuring of the site according to the various information COSSS criteria.

Allows a greater analogy and use of all types of visual and sensory elements.

Increases and improves branding and marketing possibilities, allowing a greater and more qualitative use of the logos, ideas, concepts, benefits, strategies, value proposals, competitive advantages and differentiation elements among others.

Improved integration of publicity and sponsorship of the site, providing increased efficiency. It facilitates and optimises sponsorship and promotion of sites both directly and indirectly, by an increased scope of analogies and synergies. Opens novel forms of cooperation with partners from diverse fields, reducing previously existing barriers by new forms of creativity and creation of analogies (such as a ski resort hosting a renowned event lending its trail map as a navigation system for a sports clothing company during its winter season, so as to heighten its athletic character and sports support).

In view of the above aspects, it is possible to increase the productivity of the site by:

Increasing competitiveness and variety of sponsorship forms

Opening the market of sponsorship and promotions (previously closed) to inter-sector and intra-sector promotions (as the offer is increased), establishing win-to-win situations in which both parties benefit by allowing previously impossible or unlikely affinities Increasing the value and effectiveness of sponsorships and other promotion forms and thereby the productivity of the site (or Internet site).

Reduced investment in systems and content costs by optimising the traffic density and download time by the user per unit of information presented, among others.

Increased traffic due to the advantages offered to the user, and thereby also increased productivity and benefits of the site.

Increase in the number of potential users of the site due to the greater ease and speed of access for a given technology (modem speed and download rate per information unit).

The Dynamic Navigation Interface is also compatible and complementary with current technologies (used partially, totally or alternatively).

Benefits to third parties of the Dynamic Navigation Interface of the present invention:

Increased possibilities for institutions, organisms or entities of all types with rights over intellectual property, personal or real estate property or property of any other type to provide both content and business platform, as these rights can be commercialised by providing the power marketer with a graphical platform analogical or relevant to the marketer of information and product or contents, integrating these third parties within the value chain (for example, a ski resort (third party) hosting a renowned event lending its trail map as a navigation system for a sports clothing company (marketer) during its winter season, so as to heighten its athletic character and sports support).

Increased awareness, popularity and impact for businesses with graphic and artistic rights (intellectual property, artistic property, etc.) by users accessing the information system (such as the aforementioned ski resort with its trail map, or the Subway system with its station and lines map) which would otherwise have a limited impact and promotion.

The value of banners is also increased by their greater visibility (one of the priorities of advertising in general) due to increased possibilities of creative integration with analogies, colour codes, visual effects, etc. It is expected that the invention will greatly increase the click-through ratio (number of mouse clicks made on links) of the banners.

As the invention is fully compatible with the use of ad-servers (complex segmentation programs will allow a banner (optionally with a link to the advertised site) to be downloaded, integrated and displayed on screen depending on the user profile according to the navigation habits), it allows the value of the banners to be increased substantially by segmenting the target public.

For the above reasons, the system disclosed represents an evolution of current COSSS (categorisation, ordering, systematisation, sectoring and segmentation) systems based on menus and traditional groupings in information technology systems where a greater or improved COSSS (categorisation, ordering, systematisation, sectoring and segmentation) is desirable or needed.

The advantages of the examples described for purposes of illustration in the scope of the Internet are not limited in any way to the use of this technology, as the Dynamic Navigation Interface of the present invention is also applicable to other technologies, such as PDA type terminals, mobile telephones, teletext, agendas, PC menus, program menus, computer programs in general both online and offline, extranet and networks of all types, data bases, interfaces between systems, applications for multimedia terminals, for selecting peripherals and sources, information switching stations, telematics applications, supports of new applications being developed or to be developed (optical books, tables of contents, virtual guides, etc.), integrated navigation systems (for cars, combining car management, net access and services), integrated home systems (appliances, central management alarms) control switches and switches of all sorts, programming languages or operative systems, portals of all types and processes associated to them, digitally controlled systems with the aid of SUI (sensory user interface) and MMI (Man-Machine Interface) (visual, acoustic, olfactory, touch screensi etc.).

In addition, the invention is presented as a perfect complement of Internet search engines, and can even replace these for searches in closed groups. Their partial inclusion in a web page can also enrich and increase the depth of the contents provided.

BACKGROUND OF THE INVENTION

In the current state of information technology, reading and obtaining said information and contents is achieved by means of elements such as sites, Internet portals, web pages, menus (which can be more or less dynamic), links, time routines based on the coordinates of a pointer (a technique known as "overmouse" by which different messages appear depending on the spot at which the mouse click is pointed), banners (or publicity elements which can also serve as links to the advertised element), pop-ups (or activation of new contents, windows, Internet micro-sites, etc.)

The information is shown on web pages in text and/or graphical format, occasionally including audiovisual means and use of memory.

In order to read, select, browse and access the information and its contents, links are used which join a key text or image with the access node for the corresponding information. Said links may be associated to different elements and be in different formats: text (letters, words or phrases) which are indicative of the information they refer to, icons, images, ordered in a menu format, presented with individual headings . . .

In this way, navigation is currently based on text or linear environments, which are generally not intuitive or visual.

In addition, the combined effect of the number of mouse clicks necessary to search for and access the desired information and the technology installed by the user (with a limited download speed), makes searching for and accessing the desired information difficult, as current systems of uni-dimensional categorisation are insufficient, demand an additional reading effort, produce an environment that is tiring for the user and limits the possibilities of marketing and promotion of the advertised brand in an Internet site.

Worthy of note among the background of the present invention is document U.S. Pat. No. 5,966,126, which describes a Graphical User Interface for a Database System to represent a search in a database. Said invention presents a plurality of Venn diagrams, each one representing an intersection of at least two sets. For each generic graphic icon, the user chooses a selection of at least one region, defining a set of outgoing data, said generic graphic icons presented on the graphical user interface as modified graphical icons, each of them showing a graphic indication of the selections, and receiving, from the user, the information regarding the existing links between the modified graphic icons to represent an inclusion characteristic composed by said sets based on the sets of outgoing data and on the information links. Once the search is defined, it can be translated if required for its execution by a normal search engine. The extracted results can be quantified and classified by the interface systems for an optimum presentation to the user.

Also worthy of mention is document U.S. Pat. No. 6,041,331 which deals with a System and Method for Graphical Display and Automatic Information Extraction of multiple documents for their visualisation. The information is pulled out from a group of documents according to a series of predefined categories. The user is presented with a visual representation of the extracted information and he/she may apply one or more filters to said information in order to produce a visual representation of the filtered contents of said information.

Lastly, although with a lesser degree of relevance, document U.S. Pat. No. 6,134,564 may be cited. This document describes a Computer Program for quickly creating and altering presentations of parameterised text data objects and their associated graphical images. This invention provides simplified interactive means for naming categories or parameters associated with each text data object, assigning values to each parameter for each text data object to associate graphic images and/or audio files with each text data object, and allows the user to view a categorised and ordered list of the selected text data objects.

DESCRIPTION OF THE INVENTION

The present invention is an evolution of current systems for Categorisation, Ordering, Systemisation, Sectoring and Segmentation of the information (hereinafter "COSSS"), facilitating and improving the creation, categorisation, presentation and search of the information, as well as broadening the possibilities of advertising and promotion within a system for searching and accessing information.

The computer readable medium encoded with a computer program for the Dynamic Navigation Interface of the present invention is composed of three main elements: Ordering and Presentation Multidimensional System to generate the Browsing Map.

Its basic mission consists of effectively distributing and representing in a navigation map all the necessary-and helpful elements for accessing the information:

Information access nodes (which not only allow individual access to the information that each represents, but also, the possibility of pre-selecting a plurality of said nodes, so all information regarding a set (union, intersection, selective, etc.) of said nodes can be accessed.

Multiple categories (or multiple "dimensions") and subsequent subcategories to which each of the said nodes is associated.

Sensory motifs or designs (graphical, auditory, tactile, olfactory) or sensory affinities required to associate each node by means of said graphic designs or sensory affinities with each and every one of the categories to which said node belongs, and Optionally, the symbols corresponding to the operators (algebraic, Boolean, Venn, Conditional or of any other type) which allow the pre-selecting one, part or all of the information access nodes as well as their categories and/or subcategories, so that the result of the search will not consider elements which point to undesired information.

With the inclusion of categories related to the information access nodes within the navigation map itself, knowledge of part of the nodes information is possible without having to access it, since in the same navigation map the categories with which each node has been associated are shown implicitly.

The methods for implementing the Multidimensional Ordering and Presentation System to generate a Navigation Map include, optionally, Linear Programming algorithms and tools which take into consideration all the nodes, categories, subcategories, the operators associated to each node, as well as their parameters, constraints and restrictions, and also graphic, sensory, mathematical, ideographic, semantic, symbolic, artistic or marketing criteria.

After it is created the navigation map is downloaded by means of computer files in a format compatible with the user's browser.

System for Pre-selection and Visual Search of Information:

Its basic mission is to endow the operators (algebraic, Boolean, Venn, conditional or any other type) whether located on the navigation map or implicit in the operation of the mouse pointer (or equivalent element) with the necessary functionality to allow pre-selecting one, part or all of the information access nodes as well as one, part or all categories and/or subcategories before accessing the information indicated by said elements. The pre-selection the user carries out is displayed on the navigation map by means of sensory intensification or dimming (visual, auditory, olfactory) in varying degrees of intensities of the elements pre-selected or un-selected (elements such as information nodes, categories and/or subcategories contained in the navigation map).

The methods for implementing the System for Pre-selection and Visual Search of Information consist of routines or programs written in event-oriented programming languages, so that they are ruled, optionally, by the pre-selection events activated by the user, by the position of the mouse pointer (or equivalent element) and, optionally, depend on a time function. Said routines or programmes can be either contained in the layer of the navigation interface residing in the user's terminal, or can be downloaded to said terminal from the navigation interface layer residing in the information provider's system.

An optional element of the System for Pre-selection and Visual Search of Information is a "Go!" button which, when activated by the user, sends the query itself according to the pre-selected elements (information nodes, categories and/or subcategories).

The query consists of the sending a computer file (to the information provider) containing all the requirements for the search. The means to carry out said query are routines or programmes which (in a language compatible with the database to be accessed) write a file with all the pre-selected elements (as well as any other information which may considered of interest), so that the information requested from said database can be extracted and sent to the user who requested it to be displayed, with all search and COSSS criteria and their relationships remaining implicit and/or explicit.

(The process of extracting the information from the database is not part of the present invention).

System for Presenting the Requested Information:

(Once the navigation interface's layer residing in the user terminal receives all the information supplied by the provider), its basic purpose is presenting to the user:

The information extracted (which conforms to the criteria defined by the System for Pre-selection and Visual Search of Information).

A new navigation map (to configure a deeper categorisation) again invoking the Multidimensional Ordering and Presentation System to generate the subsequent Navigation Map, or A combination thereof (the extracted information and a new navigation map).

The means for implementing the Presentation of Requested Information System include a routine or program which operates as a sequential state machine and, as such, operates in view of the present state of the search, of previous states of the search and of the type of information extracted.

Dealing in greater depth with each of the aforementioned elements of the invention, it is worth nothing that the Dynamic Navigation Interface allows navigation based on a sensory interface (graphic, auditory, etc.), where:

The information elements (categories and information access nodes):

can represent information of different nature within a same navigation map, and are presented in form of shapes, images or geometrical or sensory images, by means of their spatial distribution, affinity or sensory association, using analogies with real or abstract representations of elements such as: logos, corporate images or elements thereof, general representation of systems, whether natural or artificial, figurative or conceptual, simple or complex, random, cause-effect or within appreciable ranges of other sensory stimuli.

Furthermore, and as an aid prior to searching for information, the user can optionally use additional information elements which appear when positioning the mouse pointer (or equivalent element) over certain elements (nodes, category or subcategory), providing (in one of the embodiments of the present invention) additional information regarding the content of said element, sub-maps and, in general, time and/or sequential routines, if in the end the search were to take place; this makes it possible to save time since it allows discriminating information before accessing it, or accessing it more selectively due to the optional activation of deeper COSSE layers and possibilities of pre-selection and selection.

The information access nodes are organized within open or closed categories:

This is, their categorisation is according to one or various criteria, dependent, related or independent of each other. This is a multidimensional categorisation, where said dimensions or categories may overlap with each other and may or may not be linearly independent.

Categorisation of the information access nodes takes place by means of graphic elements according to one or more simultaneous criteria or dimensions (multi-dimensional):

Said categorisation criteria are based on relations between the elements to be classified. These relations may be of various types: mathematical, of order, geometrical, spatial, affinity, chronological, alphabetical, priority, qualitative, quantitative, sequential, methodological, by group, ideological, functional, temporary, numerical, physical, chemical, by Venn relations, simple or complex, conditional, functional, constructive, by origin, by brand, limited, unlimited, by criteria, relations or characteristics of the elements or by their relationship amongst each other inferred directly or indirectly from the graphical-visual content supporting it, directly or by analogy, etc.

To implement a graphic distinction or categorisation of the access nodes:

Elements of the Euclidean Space of any dimension are used, combining them with any type of graphic or sensory resources, particularly colour codes, textures, patterns, thickness, flashing, resources to increase or reduce general visibility, sensory visual-graphic relationships between elements (geometrical, by contrast, by analogy, etc.) and Euclidean geometry in general.

Likewise used are sensory inputs such as sounds, associated frequencies and sequences and combinations thereof. It also includes the use of sensory impulses associated with pre-selection levels in the sensory fields of taste, smell and touch, already being developed in the field of virtual reality and "MMI" (Man Machine Interface). Although the method of implementing said sensory impulses is not part of the present invention, sensory impulses are perfectly manageable by the present invention as long as the adequate transducers are available to allow transforming informatic contents (1's and 0's) into elements appreciable by the human being (images, sounds, smells, etc.)

The Multidimensional Ordering and Presentation System to generate a navigation map in which access nodes are shown categorised or differentiated from the rest. Said navigation map can be generated automatically (through programming) according to the type of information to be shown, to the previous search states or to certain configuration parameters established by the user, the provider or both.

The methods to implement said graphic differentiation or categorisation in an automated manner include Linear Programming algorithms and tools which allow a graphical representation of multidimensional Euclidean and algebraic spaces such as flat surfaces, surfaces of revolution, ruled surfaces, complex curves, imaginary spaces, infinite and discontinuous functions, etc., so that the overlaps and dependence constraints among categories, subcategories and information access nodes are included in the navigation map.

All or some of the elements which comprise the Multidimensional Ordering and Presentation System can be either contained in the navigation interface layer residing in the user's terminal, or be downloaded to said terminal from the navigation interface layer residing in the information provider's system.

The Multidimensional Ordering and Presentation System to generate the Navigation Map also allows the inclusion of advertising or commercials in certain areas according to the segmentation carried out for each user profile (using files known as "cookies" which contain information about the user's search habits and which are read by servers called "ad-servers" in charge of inserting adequate advertising elements in the areas of the navigation map intended for this purpose).

As mentioned when describing the Multidimensional Ordering and Presentation System to generate the Navigation Map, the symbols corresponding to the operators (algebraic, Boolean, Venn, conditional or of any other type) which allow pre-selecting the desired elements, do not necessarily have to be displayed in said navigation map. In such a case, and according to one of the possible embodiments of the Information Visual Search and Pre-election System to pre-select, unselect or carry out any operation with a given information element, it is enough to approach the mouse pointer (or equivalent element) to said element and use one of the buttons of said mouse (or any input peripheral associated to a Man-Machine Interface or Sensory User Interface) by means of different combinations (click, double-click, sequence and/or operating frequency of said buttons) corresponding to each of the possible operations on each of the elements (category and information access nodes).

The means in charge of supporting all of this functionality include routines and programs written in event-oriented programming languages residing within the Pre-selection System.

In one of the possible embodiments of the invention, the Information Visual Search and Pre-selection System has event-oriented routines or programmes which, when positioning the mouse pointer (or equivalent element) on a certain category or information access node, will endow the element with mathematical functions which could be operated like the rest of the operator of said Pre-Selection System. In this way it is possible to select nodes or categories along with quantitative entities (such as price, number, weight, etc.).

In another of the possible embodiments of the invention, when prioritising, ordering or weighting the importance of the different extracted information elements after the search is carried out, the Information Visual Search and Pre-selection System has routines and programmes which allow (separately or in combined manner):

The user to establish the order in which the information (result of the search) should be displayed by establishing a sequence or order of priority for each of the information access nodes (or a subset of these).

The system itself to order or truncate (up to a maximum number) the information (result of the search) by means of a series of evaluation criteria (configurable or fixed) among which are: the content of the information heading, the content of the sections or categories in which said information is classified, "key" words (visible or not) contained in said information, discrimination by plurals, capital letters, accents, etc.

In both cases, the means supporting said functionality include routines and programmes which attach to the text file containing the rest of the query data, the ordering, prioritisation or sequencing data written in a language compatible with the database to be accessed. In this way, when the database receives said file it will have all the necessary information to extract the requested information in an orderly and/or prioritised manner, in accordance with the specifications established by the user or the system.

As previously described, while the user is carrying out the pre-selection of the elements (categories and information access nodes) with which to carry out the search, the Pre-Selection system displays the elements the user is pre-selecting (or unselecting) in the navigation page by a sensory intensification or dimming (visual, auditory, olfactory, etc.) of said elements in varying degrees or states. Said states include, at least: total or partial illumination, total or partial shut-off, total or partial enabling or disabling, etc. and direct access to the information pointed to by an information access node.

The Dynamic Navigation Interface also has editable configuration files allowing the user to select among different sensory levels of man-machine accessibility, both qualitative (visual, auditory, etc.) and quantitative (sizes, colour, brightness, contrast, volume, language, etc.) to be used depending on the user's preferences or handicaps.

The Dynamic Navigation Interface may be integrated within a traditional Browser endowed with the "Bookmarks" function, so that accessing this function of the traditional browser would invoke routines and programmes for calling the Dynamic Navigation Interface of the present invention, which would either be directly executed (if the Interface resides within the user's system), or would connect with the navigator's provider system for downloading to the user's system (if the Interface does not reside within the user's system).

Finally, it should be highlighted that as the Dynamic Navigation Interface manages information stored in a digitalised form (1's and 0's), the type of information that said Interface is able to manage includes, among others: text, images, audio, video or any other type of information that can be transported by electronic, magnetic, optical, radio-frequency means or by any other method.

As an extension of the basic operation of the invention described at the beginning of the present section, the following Dynamic Navigation Interface operation models can also be described:

Operation in Parallel:

Whenever two or more navigation maps allow selecting elements according to multiple types of categories or selection criteria. As this is a multidimensional system, these categories may be categorised themselves into super-categories (with their corresponding overlaps and dependency relationships), and so on. In this way, a combined search can be carried out according to the criteria specified in one, several or all of the navigation maps available simultaneously. This leads to a greater searching power.

Operation in Series:

Corresponds to a dynamic system where a selection of information elements (nodes or categories) activates, in turn, another navigation map, which depends on the selection. This second navigation map is generated by the Multidimensional Ordering and Presentation System once it has been invoked, in turn, by the Requested Information Presentation System, which as previously explained is implemented by means of a sequential state machine or program which, as such, operates according to the type of information extracted, the current previous search states and other parameters such as configurable and fixed parameters, depending on time elapsed, on position of the mouse pointer (or equivalent element), etc.

Dependent Simultaneous Operation:

Whenever two or more navigation maps or sub-maps operate simultaneously in a conditioned manner; that is, whenever one or several such navigation maps change content depending on the pre-selection state of the elements (category and information access nodes) established by the user in one of the other maps.

Combined Operation:

Allows the combination of any of the previously described operations and the implementation of multiple combined complex dynamic systems, provided with a capacity to calculate, pre-select, select and categorise with an exponentionally growing search power.

The previously-described means for implementing the operation models are identical to those described above for the operation of the system based on a single navigation map, with the exception that each of the sub-systems that include each of the said navigation maps communicates with the rest by means of a system of interruptions and/or message queue which manages the messages between said sub-systems.

These messages consist of text files specifying at least one of the following elements: subsystem of origin of the message, destination subsystem of the message, information to be provided to the destination subsystem and queries sent to the destination subsystem of the message.

BRIEF DESCRIPTION OF THE FIGURES

Next are provided a set of drawings meant to aid a better understanding of the text, which form an integral part of it and, for purposes of illustration only in a non-limiting sense, show certain aspects of the invention.

DETAILED DESCRIPTION OF AN EMBODIMENT OF THE INVENTION

As the present invention is applicable to a great variety of areas or systems (listed above at the end of the "Object of the Invention" section), this section describes one of the possible embodiments of the present invention, applied to the Internet, without this implying any limitation of other embodiments of the invention. In order to aid the understanding of an embodiment of the invention corresponding to a Dynamic Navigation Interface for using the Internet to access information regarding the dishes offered by a chain of restaurants serving Indonesian and Chinese cuisine, the following are taken as premises:

There exist 7 different dishes:
Chinese food:
  Oriental duck (made with duck and rice)
  Peasant's duck (made with duck and vegetables)
  Imperial duck (made with duck, rice and vegetables)
  3 delights rice (made with rice and vegetables; this is a vegetarian dish and it is possible to order half a portion)
Indonesian food:
  Roasted Pig (made with Pork, Rice and Vegetables; it is possible to order half a portion)
  Vegetable plate (made with vegetables; a vegetarian dish)
  Oriental Pig (made with pork and rice).

The information to be displayed (not represented in the figures) can consist of a more detailed description of each dish (calories, etc.) together with its price and various methods of payment, if finally ordered.

Figure 3:
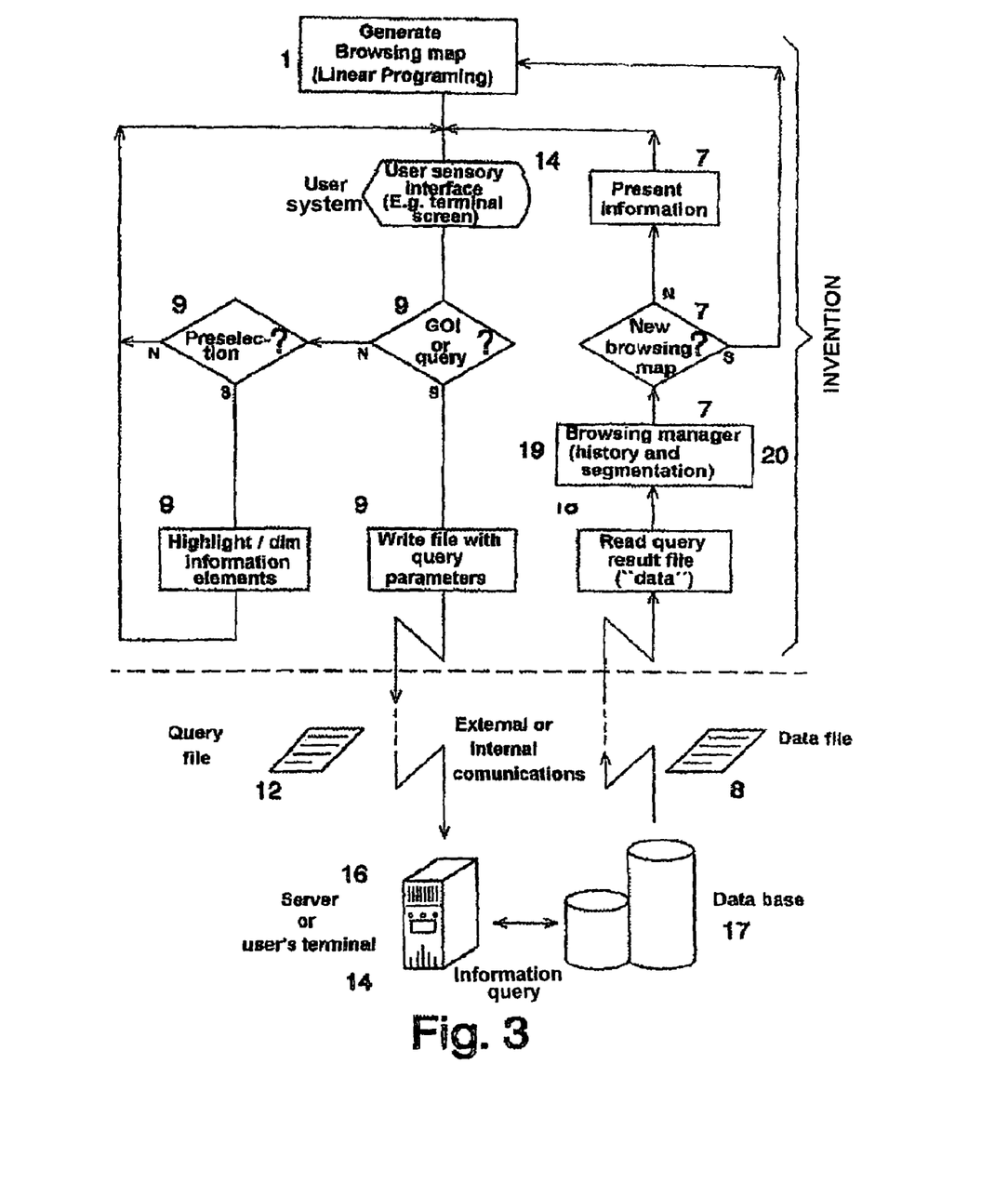
FIG. 3 shows a flow chart showing the part of the information request, search and presentation process within the scope of the present invention, as well as the basic processes involved.

The Dynamic Navigation Interface (see FIG. 3) of the present invention (known as "Visual Finder") consists of three main elements:

A Multidimensional Ordering and Presentation System (1) for generating the Navigation Map (2):
  Its main purpose is to distribute and display effectively on the navigation map (2) of the restaurant's web page (shown in FIG. 1) all information and help elements (3, 4) for accessing the information, to wit:
  The nodes (3) for accessing the information, or the menu dishes (which allow both individual access to the information represented by each one and the possibility of pre-selecting a plurality of such nodes (3) (or menu dishes), so that all the information regarding a set (union, intersection, selective, etc.) of such dishes can be accessed.
  The various categories (4) or dimensions, such as ingredients (rice, duck, etc.), type of cuisine (Chinese or Indonesian), possibility of ordering half a portion, and the subsequent subcategories (5) associated to each dish (3) (see FIG. 1).
  The sensory designs (6) (graphical, auditory, olfactory, tactile, etc.) required for each node (3) or menu dish to be related by said sensory designs (6) (in this case graphical designs) with each and every category (4) to which said dish (3) belongs (as its ingredients, type of cuisine, etc.), and
  Optionally, the symbols corresponding to search operators (13) (algebraic, Boolean, Venn, conditional or any other type) allowing to select one, part or all dishes or information access nodes (3), as well as their categories (4) and/pr subcategories (5), so that the result of the search does not include the information elements (3, 4) leading to a menu information that is not wanted.

Figure 1:
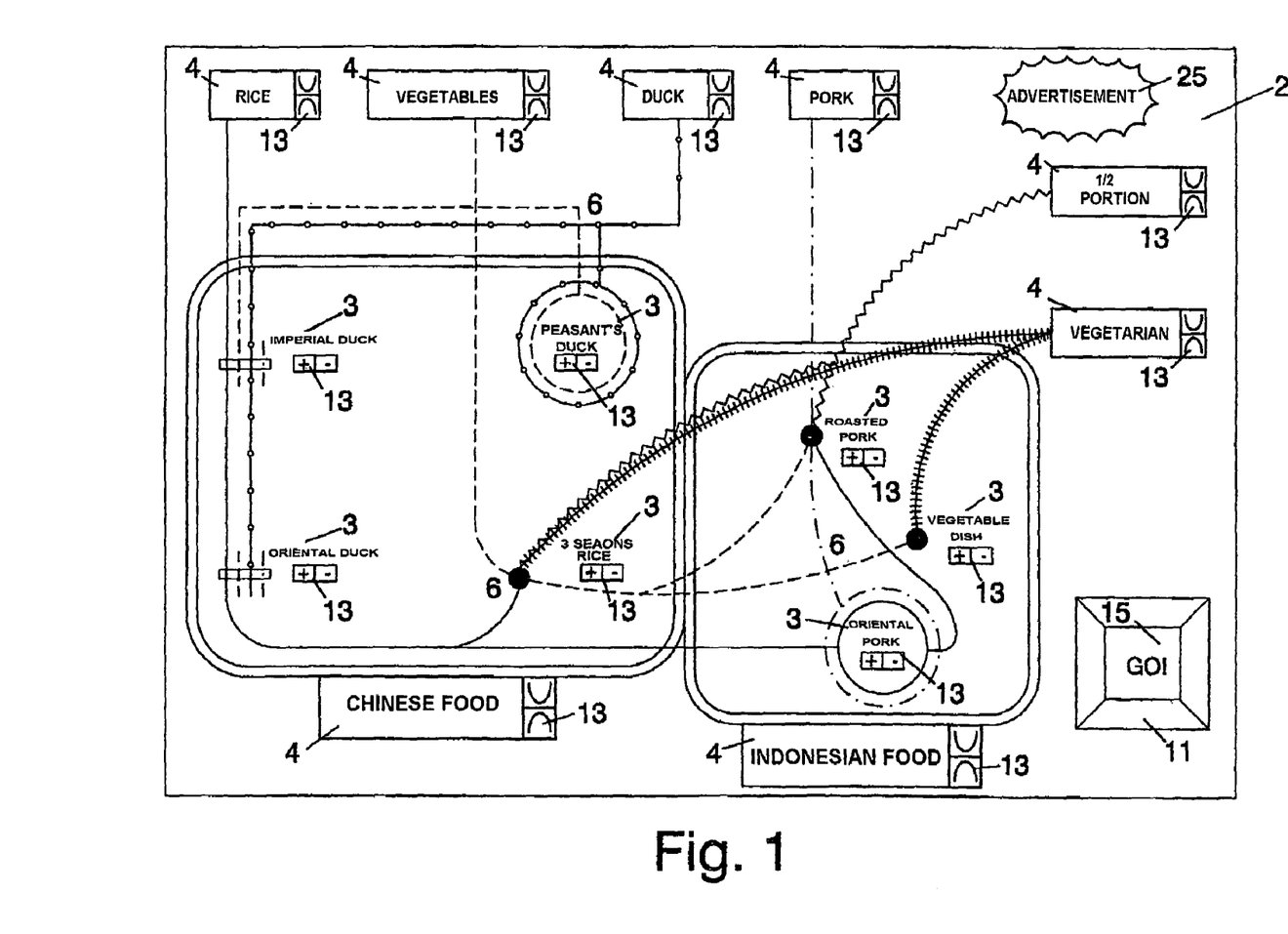
FIG. 1 shows a navigation map created for a restaurant chain offering Chinese and Indonesian cuisine, in which graphic designs display the relations existing between the various dishes (information access nodes) and the various ingredients, types of cuisine, etc. (categories), as well as several search operators.

Including categories (4) relative to information access nodes (3) within the navigation map (2) of the restaurant chain allows knowing part of the information on the dish without having to access it, as the navigation map (2) shows implicitly the ingredients, the type of cuisine, etc. associated to each dish.

The means for implementing the Multidimensional Ordering and Presentation System (1) used to generate the Navigation Map (2) include algorithms and linear programming tools which consider all nodes (3), categories (4), subcategories (5), the operators (13) associated with each node (3) (menu dish) and their parameters, constraints and restrictions, as well as graphical, sensory, mathematical ideographical, semantic, symbolic, artistic or marketing criteria.

After the navigation map (2) for the restaurant chain has been created it is downloaded by means of computer files in a format compatible with the user's browser. These files can be written in the formats html, xml, wml, jpeg, gif, bmp, mov, avi, mp3, mpeg, wav, java, text, image, sound, video, smell and touch.

System for Pre-selection and Visual Search of Information (9) (see FIGS. 1 and 2):
  Its basic purpose is to endow search operators (13) (algebraic, Boolean, Venn, conditional or any other type), whether located in the navigation map (2) or implicit in the operation of the mouse pointer (23) (or equivalent element), with the required operability to allow pre-selection of one, some or all information access nodes (3) (or menu dishes) as well as of one, some or all categories (4) and/or subcategories (5) before proceeding to the information access pointed to by said elements. The pre-selection made by the user is presented in the navigation map (2) by means of a sensory intensification or dimming (visual, auditory, olfactory, etc.) in varying degrees of intensity, of the pre-selected information elements (10) or unselected (information elements such as menu dishes (3), categories (4) (ingredients, etc.) and/or subcategories (5) contained in said navigation map (2)).

Figure 2:
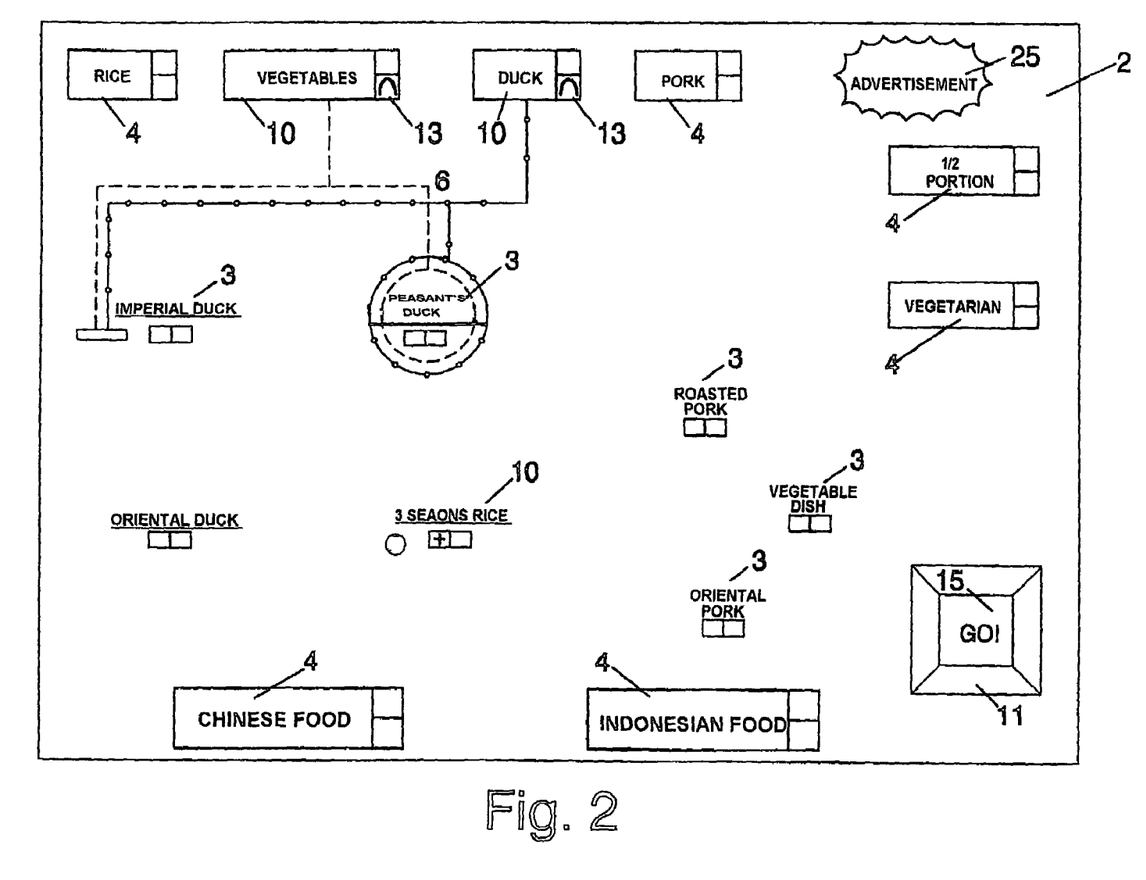
FIG. 2 shows the navigation map of FIG. 1 where the user has pre-selected the ingredients "vegetables" and "duck" with the Intersection search operator, and where the dish "3 delights rice" has also been individually pre-selected.

FIG. 2 shows the same navigation map (2) as in FIG. 1, in which the user has pre-selected the ingredients "vegetables" and "duck" operated by the Intersection search operator (13) and where, in addition, the user has pre-selected the dish "3-seasons rice" individually. The result of said pre-selection includes the dishes (10): "imperial duck", "peasant's duck" and "3-seasons rice". Once this pre-selection has taken place if the user activates the "Go!" search process activation operator (11), a more exhaustive information on the 3 previously mentioned dishes (10) will be shown, since said dishes are the only ones which satisfy all search criteria.

The means to implement the Information Visual Search and Pre-Selection System (9) consist of routine or programs written in event-oriented programming languages, so that they are governed by pre-selected events activated by the user and, optionally, depend on a time function. To this end, programming languages such as Visual Basic, Visual C, C and Java could be used.

Said routines or programs may be either contained in the layer of the navigation interface which resides in the user's terminal (14), or can be downloaded to said terminal from the layer of the navigation interface which resides in the information provider system (16).

An optional element of the Information Visual Search and Pre-Selection System (9) consists of an activation button or operator (11) belonging to the "Go!" search process which, when activated by the user, proceeds to send the search request itself according to the information elements that have been previously pre-selected (10) (menu dishes, ingredients, etc.)

The query (12) (see FIG. 3) consists of sending a computer file (to the information provider) containing all the requirements for the search. The means to carry out said query (12) are routines or programmes (written in Visual Basic, Visual C, C, Java, or any other language) which write a file, in a language compatible with the database to be accessed, containing all the information elements (3,4) that have been pre-selected (as well as any other information which could be considered of interest) to be able to extract the requested information (8) from said database (17) and send it to the user who requested it for presentation, with all the search and COSSS criteria, as well as their relationships, remaining implicitly and/or explicitly present.

Said query (12) could be written in SQL, DB2, Access, text or any other access language for databases (17).

(The information extraction process form the database (17) itself is not a part of the present invention).

Presentation System (7) for the Requested Information (8):

Once the navigation interface layer residing in the user's terminal (14) receives all the information found (18) by the provider (in this case the restaurant chain), its basic mission consists of presenting the user with the following:

The extracted information (which obeys the criteria as defined by the System for Pre-selection and Visual Search of Information (9)), A new navigation map (2) (to carry out a more in-depth categorization, for example to select to which restaurant in question the order will be made, or select the method of payment, etc.) invoking once again the Multidimensional Ordering and Presentation System (1) to generate the subsequent Navigation Map, or A combination of both (the extracted information and a new navigation map).

The means for implementing the Presentation System (7) for the Requested Information (6) include a routine or program which operates as a sequential state machine and, as such, operates in accordance to the current search state, previous search states (19) and to the type of information extracted. Said routine or program may be implemented in a programming language such as Visual Basic, Visual C, C or Java; so that it can process data files (8) which contain the request information in a language such as SQL, DB2, Access, text or any other language oriented to accessing databases (17).

Considering each of the previously mentioned elements of the invention in greater detail, it should be remarked that the Dynamic Navigation Interface allows navigation based on a sensory interface (graphic, auditory, etc.) in which:

The menu dishes, ingredients, etc. or information elements (3,4):

Can represent information of different nature in a same navigation map; these are displayed as shapes, images or geometric or sensory elements, by means of their spatial distribution, affinity or sensory association, using analogies with real or abstract displays of elements such as: logos, corporate images or elements of the former, display of systems in general, natural or artificial, figurative or conceptual, simple or complex, random, cause-effect or with perceivable ranges of other sensory stimuli.

In addition, and as an aid prior to the information search, (see FIG. 4), the user has extra information areas (24) available which are displayed when positioning the mouse pointer (23) (or equivalent element) on a certain element (such as the "Weight" category (4) of a clock) and which supply additional information about the content of said element; this makes saving time possible as it allows information to be discriminated before accessing it, or accessing it in a more selective manner as the deeper layers of COSSS and pre-selection and selection possibilities can be optionally activated. This functionality is performed by one or various computer routines written in an event-oriented programming language of choice, such as Visual Basic, Visual C, Java or any other event oriented code.

Information access nodes (3) are organised in open or closed categories (4):

This is, they are categorised according to one or more criteria which can be dependent, related or independent of each other. This is a multi-dimensional categorisation in which the dimensions or categories (4) can overlap each other and be linearly independent or not.

Categorization of the information access nodes (3) is achieved by sensory designs (6) (graphic, auditory, tactile, olfactory, etc.), in accordance to one or more simultaneous criteria or dimensions (multi-dimensional):

These categorisation criteria are based on relationships between the elements to be classified. These relationships may be of different kinds: mathematical, by order, alphabetical, by priority, qualitative, quantitative, sequential, methodological, by group, ideological, functional, temporary, numerical, physical, chemical, by Venn sets, simple or complex, conditional, functional, constructive, by origin, by brand, limited, unlimited, by criteria, relationships or characteristics of the elements or of the relationship among them inferred directly or indirectly from the same graphic-visual content which supports it, whether directly or by analogy.

To implement a graphic distinction or categorisation of the information access nodes (3):

Euclidean space elements of any dimension are used, combining them with any type of graphic or sensory resources, especially colour codes, textures, patterns, thickness, flashing, resources to increase or reduce visibility in general, sensory-visual-graphic relationships between elements (geometric, contrast, by analogies, . . . ) and Euclidean geometry in general.

Also used are associated sensory impulses, such as sounds, associated frequencies and sequencing and combination of the same. It also considers the use of sensory impulses associated with pre-selection levels in the sensory fields of taste, smell and touch, already in development in the area of virtual reality and "MMI" (Man-Machine Interface). Although the implementation method of said sensory impulses are not part of the present invention, said sensory impulses are perfectly manageable by the present invention as long as the adequate transducers allowing transformation of digitalised data (1's and 0's) into elements appreciable to the human being (images, sounds, smells . . . ) are available.

The Multidimensional Ordering and Presentation System (1) for generating a navigation map (2) in which the information access nodes (3) (or menu dishes) are displayed in a distinguishable and categorized manner. This navigation map (3) can be generated automatically (by programming) according to the type of information to be shown, from the previous search states (19) or from specific parameters of configuration established by the user, the provider or both.

The means to implement said graphic distinction or categorisation automatically include Lineal Programming tools and algorithms which allow the graphic representation of multidimensional Euclidean and algebraic spaces, such as flat surfaces, surfaces of revolution, ruled surfaces, complex curves, imaginary spaces, infinite and discontinuous functions, etc. so that all the overlapping and dependency constraints between categories (4), subcategories (5) and the information access nodes (3) are included in the navigation map (2).

All or some of the elements which form the Multidimensional Ordering and Presentation System (1) may either be contained in the navigation interface layer residing in the user's terminal (14), or be downloaded to said terminal from the navigation interface layer residing in the information provider's remote system (16).

The Multidimensional Ordering and Presentation System (1) for generating a Navigation Map (2) also allows the inclusion of advertising (25) in determined areas in accordance to the segmentation (20) carried out for each user profile in question (by means of one of the files known "cookies" which contains information about the search routines of the user and which are read by servers called "ad-servers" in charge of inserting the adequate advertising elements (25) in the areas provided for this purpose in the navigation map (2)).

As mentioned when describing the Multidimensional Ordering and Presentation System (1) for generating a Navigation Map (2), the symbols which correspond to the search operators (13) (algebraic, Boolean, Venn, conditional or of any other kind) which allow pre-selecting the desired elements, do not have to be displayed in said navigation map (2). In this case, and according to one of the possible embodiments of the Information Visual Search and Pre-Selection System (9), in order to pre-select, unselect, or carry out any operation with a given element of information (3,4,) it is enough to approach the mouse pointer (23) (or equivalent element) to said element and use one of the buttons of said mouse (or any input peripheral associated to any Man-Machine Interface or Sensory User Interface) by means of different combinations (click, double-click, activation sequence and/or frequency of said buttons) which respond to each one of the possible operations on each of the elements (category and information access nodes).

The means in charge of supporting this entire functionality include routines or programmes written in event-oriented programming languages resident in the Pre-Selection System (9).

In one of the possible embodiments of the invention, the Information Visual Search and Pre-selection System (9) has event-oriented routines or programmes which, when positioning the mouse pointer (23) (or equivalent element) on a certain category (4) or information access node (3), will endow the element with mathematical functions which could be operated like the rest of the operator of said Pre-Selection System (9). In this way it is possible to select information access nodes (3) or categories (4) along with quantitative entities (such as price, number, weight, etc.).

In another of the possible embodiments of the invention, when prioritising, ordering or weighting the importance of the different extracted information elements after the search is carried out, the Information Visual Search and Pre-selection System (9) has routines and programmes which allow (separately or in combined manner):

The user to establish the order in which the information (result of the search) should be displayed by establishing a sequence or order of priority for each of the information access nodes (3) (or a subset of these).

The system itself to order or truncate (up to a maximum number) the information (result of the search) by means of a series of evaluation criteria (configurable or fixed) among which are: the content of the information heading, the content of the sections or categories in which said information is classified, "key" words (visible or not) contained in said information, discrimination by plurals, capital letters, accents, etc.

In both cases, the means supporting said functionality include routines and programmes which attach to the text file containing the rest of the query data, the ordering, prioritisation or sequencing data written in a language compatible with the database (17) to be accessed. In this way, when the database receives said file it will have all the necessary information to extract the requested information (8) in an orderly and/or prioritised manner, in accordance with the specifications established by the user and/or the system.

As previously described (see FIG. 2), while the user is pre-selecting the information elements (3, 4) (dishes, ingredients, type of cuisine, etc.) with which to carry out the search, the Pre-Selection System (9) displays the information elements (3, 4) (dishes, ingredients, type of cuisine, etc.) which the user is pre-selecting (or unselecting) in the navigation map (2) by a sensory intensification or dimming (visual, auditory, olfactory, etc.) of said elements (3, 4) in varying degrees or states. These states include, at least: total or partial illumination, total or partial shut-off, total or partial enabling or disabling, etc. and direct access to the information pointed to by an information access node (3).

The Dynamic Navigation Interface also has editable configuration files allowing the user to select among different sensory levels of man-machine accessibility, both qualitative (visual, auditory, etc.) and quantitative (sizes, colour, brightness, contrast, volume, language, etc.) to be used depending on the user's preferences or handicaps.

The Dynamic Navigation Interface may be integrated within a traditional Browser endowed with the "Bookmarks" function, so that accessing this function of the traditional browser would invoke routines and programmes for calling the Dynamic Navigation Interface of the present invention, which would either be directly executed (if the Interface resides within the user's system (14) or PC), or would connect with the remote system (16) of the navigator provider for its download to the user's PC (if the Interface does not reside within the user's PC).

The Multidimensional Ordering and Presentation System (1) for the Navigation Map (2) can additionally have means to allow the user to move all or part of the navigation map (2), in order to reveal or conceal certain parts of it. This movement can involve translation, rotation, approaching, distancing, separation, union, etc. These functionalities would be useful, for example, when the navigation map (2) adopts a spheroid shape. To support this movement functionality the Multidimensional Ordering and Presentation System for the Navigation Map will have computer routines written in Visual Basic, Visual C, C, java or any other computer language allowing to process information graphically.

Finally, it should be highlighted that as the Dynamic Navigation Interface manages information stored in a digitalised form (1's and 0's), the type of information that said Interface is able to manage includes, among others: text, images, audio, video or any other type of information that can be transported by electronic, magnetic, optical, radio-frequency means or by any other method.

Figure 4:
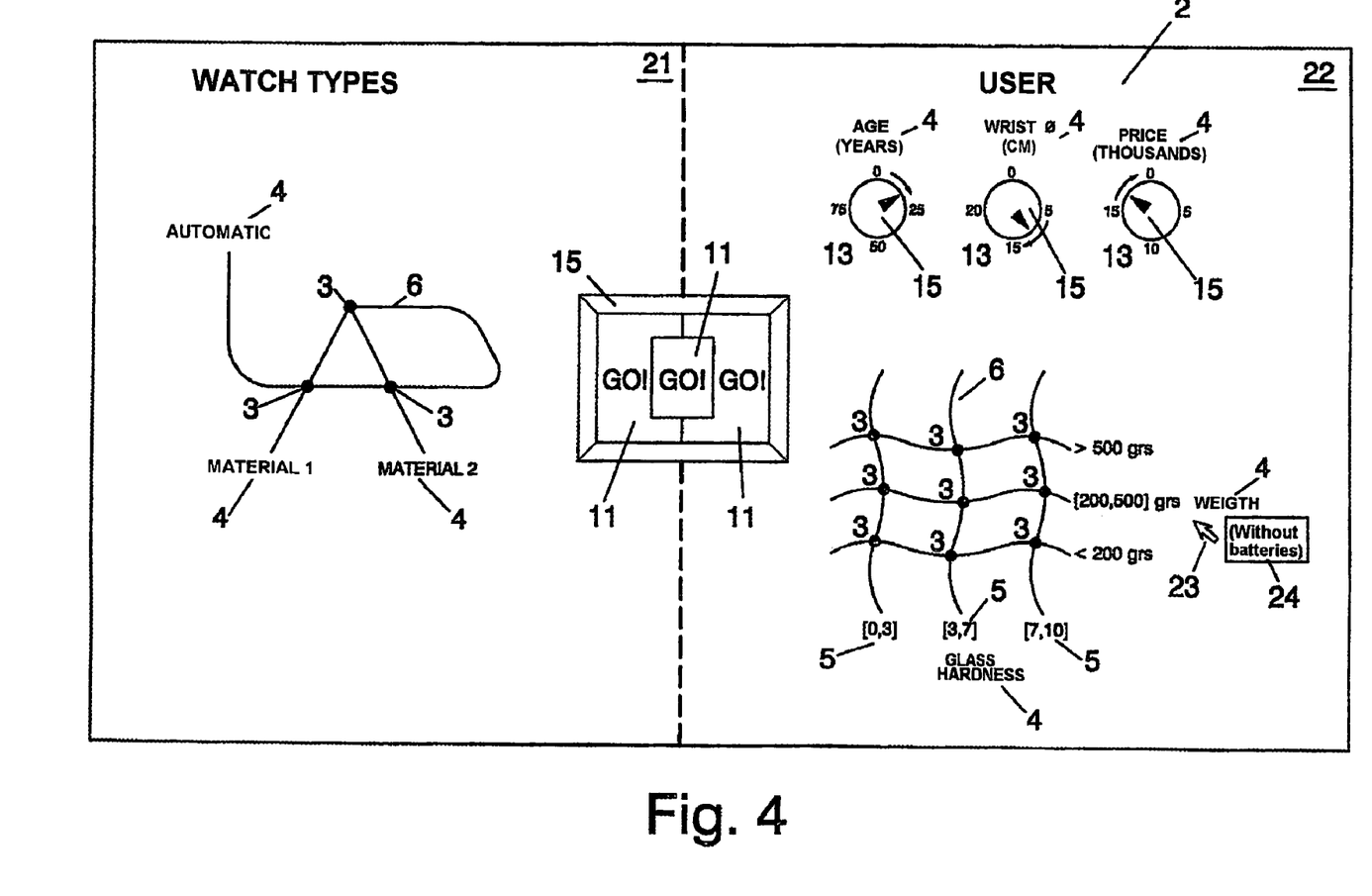
FIG. 4 shows a navigation map created for a brand of watches, in turn divided into two navigation sub-maps. As there are Go! operators for activating the search process for each navigation sub-map and for the navigation map encompassing both it is possible to carry out searches according to the criteria established in one, the other or both navigation sub-maps.

As an extension of the basic operation of the invention described at the beginning of the present section, the following Dynamic Navigation Interface operation models can also be described:

Operation in Parallel (see FIG. 4):

Whenever two or more navigation maps (2, 21, 22) allow selecting information elements (3, 4) according to multiple types of categories (4) or selection criteria. As this is a multidimensional system, these categories (4) may be categorised themselves into super-categories (with their corresponding overlaps and dependency relationships), and so on. In this way, a combined search can be carried out according to the criteria specified in one, several or all of the navigation maps (2, 21, 22) available simultaneously. This leads to a greater searching power.

In the case shown in FIG. 4, and depending on the search process activation operator (11) "Go!" activated by the user, the search process will consider the criteria specified in the navigation submap on the left (21) (left-hand Go! operator), the criteria specified in the navigation submap on the right (22) (right-hand Go! operator), or the criteria specified in both navigation submaps (2, 21, 22) (central Go! operator).

Operation in Series:

Corresponds to a dynamic system where a selection of information elements (3, 4) (information access nodes (3) or categories (4)) activates, in turn, another navigation map (2) which depends on the selection. This second navigation map is generated by the Multidimensional Ordering and Presentation System (1) after being invoked, in turn, by the Requested Information (8) Presentation System (7), which as previously explained is implemented by means of a sequential state machine or program which, as such, operates according to the type of information extracted, the current search state, previous search states (19) and other parameters such as configurable and fixed parameters, depending on time elapsed, on position of the mouse pointer (23) (or equivalent element), etc.

Dependent Simultaneous Operation:

Whenever two or more navigation maps (2) or sub-maps operate simultaneously in a conditioned manner; that is, whenever one or several such navigation maps change content depending on the pre-selection state of the information elements (3, 4) (categories (4) or information access nodes (3)) established by the user in one of the other maps.

Combined Operation:

Allows the combination of any of the previously described operations and the implementation of multiple combined complex dynamic systems, provided with a capacity to calculate, pre-select, select and categorise with an exponentionally growing search power.

The previously-described means for implementing the operation models are identical to those described above for the operation of the system based on a single navigation map, with the exception that each of the sub-systems that include each of the said navigation maps communicates with the rest by means of a system of interruptions and/or message queue which manages the messages between said sub-systems. These messages consist of text files specifying at least one of the following elements: subsystem of origin of the message, destination subsystem of the message, information to be provided to the destination subsystem and queries sent to the destination subsystem of the message.

The invention claimed is:

1. Computer-readable medium encoded with a computer program for a navigation system for accessing information, compatible with at least one interface selected among visual, acoustic, tactile, olfactory interfaces and combinations thereof, allowing a user to access information according to at least one criterion selected among categorization, ordering, systematization and sectoring criteria and combinations thereof, this system wherein:

multidimensional ordering and presentation system (1) to generate at least one navigation map (2) previously to launch a query, having means to distribute and display help elements on the navigation map which help accessing the information, these help elements comprising:

a plurality of information elements (3, 4) selected from among:

a plurality of information access nodes (3) which allow individual access to the information represented by each one;

a plurality of dimensions comprising categories (4) to which each node (3) may be associated, these categories (4) including sub-categories (5) which derive from the various information levels of a categorization resulting from a deeper categorization;

wherein the different dimensions are distributed in an Euclidean space of at least two dimensions, and the methods to implement said graphic differentiation or categorization in an automatic manner include linear programming algorithms and tools which allow a graphical representation of at least two Euclidean dimensions; wherein a subset of said information elements (3,4) or all of these incorporates a system for pre-selection and visual search of information (9) which includes at least one activation operator (11) for the search process, and it also includes search operators (13) to allow preselecting at least one information element (3,4);

sensory designs (6) selected among graphic, audible, tactile, olfactory designs and designs which can be perceived by the user, complying with at least the requirement that each information access node (3) is associated by means of said sensory designs (6) with each and all categories (4) with which this node is associated;

a system (7) for displaying information (8) which is activated after receiving at least one information selected among: the requested information (8), at least one event related to said information and combinations thereof; with said system (7) for displaying the requested information (8) having means to show the user at least one presentation selected from among:

the requested information that has been extracted;

as many subsequent navigation maps that may derive from the various categorisation levels corresponding to a deeper categorisation; invoking the multidimensional ordering and presentation system to generate subsequent navigation maps;

and combinations thereof;

wherein the system for pre-selection and visual search of information (9) with means allowing a subset of information elements (3, 4) or all of these to be pre-selected and allow access to the information relative to said information elements (3, 4), so that the result of the query complies only with the pre-selected information elements (10);

the search operators (13) allow pre-selecting at least one information element (3, 4) so that the result of the search corresponds to the criteria established by said search operators (13), selected from among algebraic, Boolean, Venn, conditional, quantitative, ordering or truncation operators, these operators determining criteria for the information search and combinations thereof.

2. Computer-readable medium encoded with a computer program for a navigation system for accessing information, according to claim 1, wherein the activation operator (11) for the search process which, when activated by the user, generates a query file (12) containing the pre-selected information elements (10).

3. Computer-readable medium encoded with a computer program for a navigation system for accessing information, according to claim 2, wherein in order to activate the operators (11, 13) the system for pre-selection and visual search of information (9) is provided with man-machine interfaces, among which are first means selected among a keyboard, mouse, voice, touch, allowing interaction between the user and the system (14), and combinations thereof, as well as second means selected among combinations, repetitions, sequences and frequencies of activation of said first means, to activate said operators (11, 13).

4. Computer-readable medium encoded with a computer program for a navigation system for accessing information, according to claim 2, wherein the query file (12) generated when activating the operator (11) that activates the search process contains the search operators (13) relating the pre-selected information elements (10) as an additional parameter for establishing the search criteria.

5. Computer-readable medium encoded with a computer program for a navigation system for accessing information, according to claim 1, wherein the navigation map (2) includes one or more areas (15) from where it is possible to activate the aforementioned operators (11, 13).

6. Computer-readable medium encoded with a computer program for a navigation system for accessing information, according to claim 1, wherein the navigation map (2) consists of at least one computer file which includes the parameters defining said navigation map (2) in a format compatible with the user's system (14).

7. Computer-readable medium encoded with a computer program for a navigation system for accessing information, according to claim 6, wherein the file or files forming the navigation map (2) are written in at least one format selected among the following: html, xml, wml, jpeg, gif, bmp, mov, avi, mp3, mpeg, way, java, text, image, sound, video, smell and touch.

8. Computer-readable medium encoded with a computer program for a navigation system for accessing information, according to claim 6, wherein the file or files forming the navigation map (2) reside in one or more locations selected among:

the user's system (14);

a remote system (16, 17), so that said files are sent to the user's system (14) from said remote system (16, 17);

a combination of the above locations (14, 16, 17).

9. Computer-readable medium encoded with a computer program for a navigation system for accessing information, according to claim 1, wherein the means of the multidimensional ordering and presentation system (1) for generating the navigation map (2) include linear programming algorithms whose calculations consider elements selected among: information access nodes (3), categories (4), areas (15) of the navigation map (2) meant for operators (11, 13), configuration parameters, restrictions of the above elements, constraints among them, graphical criteria and combinations thereof.

10. Computer-readable medium encoded with a computer program for a navigation system for accessing information, according to claim 1, wherein the means of the multidimensional ordering and presentation system (1) for generating the navigation map (2) resides in one or more locations selected among a remote system (16, 17), the user's system (14) and a combination of these locations (14, 16, 17).

11. Computer-readable medium encoded with a computer program for a navigation system for accessing information, according to claim 1, wherein the system for pre-selection and visual search of information (9) is provided with sensory stimulus means selected among visual means, auditory means, tactile means, olfactory means, means appreciable by the user and combinations thereof, in order to intensify or dim by at least one degree of intensity those information elements (3, 4) which are pre-selected (10) or unselected by the user in the navigation map (2).

12. Computer-readable medium encoded with a computer program for a navigation system for accessing information, according to claim 11, wherein the system for pres-election and visual search of information (9) means include at least one computer routine written at least partially in an event-oriented programming language, so that said routine is invoked and executed by said events.

13. Computer-readable medium encoded with a computer program for a navigation system for accessing information, according to claim 12, wherein the computer routines of the system for pre-selection and visual search of information (9) are invoked by events selected from among: positioning events on the navigation map (2), displacement events on the nv2, time events, user segmentation events, previous navigation states and combinations thereof.

14. Computer-readable medium encoded with a computer program for a navigation system for accessing information, according to claim 12, wherein the computer routines of the system for pre-selection and visual search of information (9) reside in at least one location selected from among:

the user's system (14)

a remote system (16, 17), so that these routines are downloaded from a remote system (16, 17) and executed in the user's system (14), a combination of the above locations (14, 16, 17).

15. Computer-readable medium encoded with a computer program for a navigation system for accessing information, according to claim 12, wherein the computer routines of the system for pre-selection and visual search of information (9) are written, at least partially, in at least one programming language selected among Visual Basic, Visual C, C and Java.

16. Computer-readable medium encoded with a computer program for a navigation system for accessing information according to claim 2, wherein the query file (12) is written in a language selected among SQL, DB2, Access, text, languages oriented to accessing databases (17) and combinations thereof; and it is generated by the system for pre-selection and visual search of information (9) by executing at least one computer routine written, at least partially, in a programming language selected among Visual Basic, Visual C, C and Java.

17. Computer-readable medium encoded with a computer program for a navigation system for accessing information, according to claim 16, wherein the query file (12) is processed to extract the requested information (8) in at least one location selected among the user's system (14), a remote system (16, 17) and a combination of the two.

18. Computer-readable medium encoded with a computer program for a navigation system to access information, according to claim 1, wherein the system (7) for presenting the requested information (8) acts as a sequential state machine dependent on parameters selected among: the information found (18) corresponding to the current state of the search; previous search states (19); type of information extracted; user segmentation (20); time parameters; configuration parameters of the system for presenting the requested information and combinations thereof.

19. Computer-readable medium encoded with a computer program for a navigation system for accessing information, according to claim 1, wherein the system (7) for presenting the requested information (8) is provided with at least one computer routine able to process, after receiving it, the data file (8) containing the requested information and events related to said information, so that it is possible to display on the user's system (14) a presentation selected among the requested information, a new navigation map (2) and a combination thereof.

20. Computer-readable medium encoded with a computer program for a navigation system access information, according to claim 19, wherein the computer routines of the system (7) for presenting the requested information (8) are written, at least in part, in at least one programming language selected among Visual Basic, Visual C, C, and Java; and wherein said computer routines can process the data file (8) containing the requested information in a language selected among SQL, DB2, Access, text, and languages oriented towards accessing databases (17).

21. Computer-readable medium encoded with a computer program for a navigation system for accessing information, according to claim 1, wherein as an extension of the basic operation of the invention there is a model of operation in parallel consisting of a plurality of navigation maps (2, 21, 22) where it is possible to select at least one information element (3, 4) of at least one of the navigation maps (2, 21, 22) to allow a combined information search, according to the criteria specified in at least one of the navigation maps (2, 21, 22) that are simultaneously available.

22. Computer-readable medium encoded with a computer program for a navigation system for accessing information, according to claim 1, wherein as an extension of the basic operation of the invention there is a model of operation in series wherein, by means of a sequential state machine, a selection of information elements (3, 4) belonging to a navigation map (2) generates in turn a subsequent navigation map which can in turn generate as many subsequent navigation maps are required to increase the depth of categorisation; the subsequent navigation maps depending on at least one parameter selected among: information found corresponding to the current state of the search; previous search states (19); content of the extracted information; user segmentation (20); time parameters; system configuration parameters and combinations thereof.

23. Computer-readable medium encoded with a computer program for a navigation system for accessing information, according to claim 1, wherein as an extension of the basic operation of the invention there is a model of simultaneous-independent operation wherein at least two navigation maps (2, 21, 22) operate simultaneously in a conditioned manner, so that when the user changes the pre-selection state of the information elements (3, 4) of at least one of the aforementioned maps (2, 21, 22) the content of at least one of the remaining navigation maps (2, 21, 22) also changes.

24. Computer-readable medium encoded with a computer program for a navigation system for accessing information, according to claim 21, wherein as an extension of the basic operation of the invention there is a combined operation mode consisting of combinations of the above-described operation modes in order to create multiple complex systems.

25. Computer-readable medium encoded with a computer program for a navigation system for accessing information, according to claim 21, wherein the individual operation of each navigation map of the operational models described above is basically the same as that of a navigation map (2) operating independently, except that each navigation map (2, 21, 22) communicates with the other navigation maps (2, 21, 22) by means of a system of interruptions managing a message queue, where a plurality of messages are stored containing information related to the form of mutual interaction of the navigation maps (2,21,22).

26. Computer-readable medium encoded with a computer program for a navigation system for accessing information, according to claim 25, wherein the messages for communication among the navigation maps (2, 21, 22) consist of messages selected among commands, files and a combination thereof including at least one indication selected among: the map of origin of the message, the destination map of the message, information, requirement and combinations thereof.

27. Computer-readable medium encoded with a computer program for a navigation system accessing information, according to claim 1, wherein both the information elements (3, 4) and the sensory designs (6) are spatially distributed in a navigation map (2) to form figures which use analogies selected among real and abstract figures, logos, corporate images, elements of corporate images, natural systems, artificial systems, figurative, conceptual, simple, complex, random, cause-effect and combinations thereof.

28. Computer-readable medium encoded with a computer program for a navigation system for accessing information, according to claim 1, wherein when moving on the navigation map (2) an element selected among a mouse pointer (23), a cursor, a joystick and a sensory user interface, positioning it on or near an information elements (3, 4) at least one additional information area (24) appears consisting of an indication selected among text, image, sound, color, tactile sensations and combinations thereof related to said information elements (3, 4).

29. Computer-readable medium encoded with a computer program for a navigation system for accessing information, according to claim 28, wherein the additional information area (24) appears by means of at least one computer routine written, at least in part, in at least one event-oriented computer language selected among Visual Basic, Visual C, C, Java and event-oriented code; so that when the user positions an element selected among mouse pointer (23), a cursor, a joystick and a sensory user interface on or near an information elements (3, 4) the aforementioned program or programs are invoked and executed.

30. Computer-readable medium encoded with a computer program for a navigation system for accessing information, according to claim 1, wherein the information access nodes (3) are organised into multiple "dimensions" corresponding to categories (4) which can overlap each other, so that each node (3) can belong to at least one category (4).

31. Computer-readable medium encoded with a computer program for a navigation system for accessing information, according to claim 1, wherein the information access nodes are organised into open categories (4), where said nodes (3) are categorised according to at least one criterion for categorising information access nodes (3) that can be both dependent and independent.

32. Computer-readable medium encoded with a computer program for a navigation system for accessing information, according to claim 31, wherein the categorization criteria are based on relations between the information elements (3, 4) to be classified, these relations being selected among relations of order, geometrical, spatial, affinity, chronological, alphabetical, priority, qualitative, quantitative, sequential, methodological, group, ideological, functional, temporal, mathematical, physical, chemical, Venn, simple, compound, conditional, functional, constructive, of origin, of brand, limited, unlimited, direct, by analogy, by criteria, by the graphical content supporting them, by characteristics of the elements, by the relations between the elements inferred directly, by the relations between the elements inferred indirectly and by combinations thereof.

33. Computer-readable medium encoded with a computer program for a navigation system for accessing information, according to claim 1, wherein to implement a graphical differentiation corresponding to a categorisation of the access information nodes (3) are used elements of Euclidean space of at least one dimension, combining them with resources selected among sensory designs (6), graphical resources, color codes, textures, patters, thickness, flashing, increased visibility, reduced visibility, graphical-visual relations among elements and combinations thereof.

34. Computer-readable medium encoded with a computer program for a navigation system for accessing information, according to claim 1, that wherein the multidimensional ordering and presentation system (1) of the navigation map (2) allows both inserting and superposing advertising elements (25) in certain areas of the navigation map (2); these advertising elements (25) being selected among advertising elements (25) of indiscriminate nature and segmented nature (20), in which case they are intended for a specific target public.

35. Computer-readable medium encoded with a computer program for a navigation system for accessing information, according to claim 34, wherein the computer routines of the multidimensional ordering and presentation system (1) of the navigation map (2) communicate with a remote system (16, 17) which stores advertising contents (25) to convey to the remote information system (16, 17) information relative to search historical records (19) and user navigation habits, so that after processing said information the remote system (16, 17) can send to the user's system (14) advertising elements (25) adapted to the user's navigation habits, so that they are incorporated to the navigation map (2) by the multidimensional ordering and presentation system(1).

36. Computer-readable medium encoded with a computer program for a navigation system for accessing information, according to claim 9, wherein the linear programming algorithms that allow a graphical representation of at least two dimensions, are selected among Euclidean spaces, algebraic spaces, straight lines, curves, complex lines, flat surfaces, surfaces of revolution, ruled surfaces, imaginary spaces, finite functions, infinite functions, discontinuous functions, and combinations thereof, so that the overlaps and dependence constraints among the information access nodes (3) and the categories (4) are included in the navigation map (2).

37. Computer-readable medium encoded with a computer program for a navigation system for accessing information, according to claim 11, wherein the computer routines of the system for pre-selection and visual search of information (9) process computer files compatible with the interfaces in charge of transforming these computer files into sensory stimuli selected among visual, auditory, tactile, olfactory stimuli, stimuli perceivable by the user and combinations thereof.

38. Computer-readable medium encoded with a computer program for a navigation system for accessing information, according to claim 1, wherein the computer routines of the system (7) for presenting the requested information (8) allow processing and displaying the content of the computer files in at least one format selected among text, image, sound, video, tactile, olfactory and combinations thereof.

39. Computer-readable medium encoded with a computer program for a navigation system for accessing information, according to claim 11, wherein the intensification and dimming of the pre-selected and unselected information elements (10) includes, at least, one level of intensity selected among total illumination, partial illumination, totally off, totally enabled, partially enabled, totally disabled and partially disabled.

40. Computer-readable medium encoded with a computer program for a navigation system for accessing information, according to claim 1, wherein this navigation system is provided with at least one editable configuration file allowing the user to select among various sensory levels of man-machine accessibility depending on his/her preference and handicaps, the sensory accessibility levels selected among levels of size, color, brightness, contrast, volume, language, touch, smell and combination thereof.

41. Computer-readable medium encoded with a computer program for a navigation system for accessing information, according to claim 1, wherein this navigation system operates within a browser from which it is possible to invoke this and other search engines operating in the browser can be invoked.

42. Computer-readable medium encoded with a computer program for a navigation system for accessing information, according to claim 1, wherein the system for pre-selection and visual search of information (9) is provided with at least one fixed or configurable computer file establishing the ordering criteria for the information to be shown after being found.

43. Computer-readable medium encoded with a computer program for a navigation system for accessing information, according to claim 1, wherein the system for pre-selection and visual search of information (9) is provided with at least one computer routine allowing the user to establish the order in which the information requested (8) is shown after being found, by means of search operators (13) associated to the information elements (3, 4) whose information is to be ordered.

44. Computer-readable medium encoded with a computer program for a navigation system for accessing information according to any of claim 42, wherein said operation obeys at least one ordering criterion selected among: the title of the information, the content of the sections into which the information is divided, visible key words, non-visible key words, words contained in the information, discrimination by plurals, by capital letters, by accents and by combinations of these criteria.

45. Computer-readable medium encoded with a computer program for a navigation system for accessing information according to claim 42, wherein the ordering criteria are attached to the file including the search criteria, so that after receiving said file the database where the information resides proceeds to order the information which complies with the search criteria.

46. Computer-readable medium encoded with a computer program for a navigation system for accessing information, according to claim 1, wherein the system for pre-selection and visual search of information (9) is provided with at least one fixed or configurable computer file establishing the criteria for truncating the set of information to be shown which comply with the search criteria.

47. Computer-readable medium encoded with a computer program for a navigation system for accessing information, according to claim 1, wherein the system for pre-selection and visual search of information (9) is provided with at least one computer routine allowing the user to establish the criteria for truncating the set of information to be shown which comply with the search criteria.

48. Computer-readable medium encoded with a computer program for a navigation system for accessing information, according to claim 46, wherein the truncation obeys at least one ordering criterion selected among: the title of the information, the content of the sections into which the information is divided, visible key words, non-visible key words, words contained in the information, discrimination by plurals, by capital letters, by accents and by combinations of these criteria.

49. Computer-readable medium encoded with a computer program for a navigation system for accessing information, according to claim 46, wherein the truncation criteria are attached to the file including the search criteria, so that after receiving said file the database (17) where the information resides proceeds to truncate the information which complies with the search criteria.

50. Computer-readable medium encoded with a computer program for a navigation system for accessing information, according to claim 1, wherein the multidimensional ordering and presentation system for the navigation map is provided with means allowing the user to move all or part of the navigation map (2) in order to show or hide parts of it; this movement being selected among translating, rotating, approaching, distancing, separating, joining and combinations thereof.

51. Computer-readable medium encoded with a computer program for a navigation system for accessing information according to claim 50, wherein the navigation map (2) has a spheroid form provided with at least one movements selected among translating, rotating, approaching, distancing, separating, joining and combinations thereof.

52. Computer-readable medium encoded with a computer program for a navigation system for accessing information according to claim 50, wherein the functionality of moving the navigation map (2) is supported by computer routines written, at least in part, in at least one programming language selected among Visual Basic, Visual C, C and Java.

* * * * *